(12) United States Patent
Paskiewicz et al.

(10) Patent No.: US 12,454,118 B2
(45) Date of Patent: Oct. 28, 2025

(54) COMPOSITE DISPLAY COVER

(71) Applicant: Motorola Mobility LLC, Chicago, IL (US)

(72) Inventors: Deborah M. Paskiewicz, Downers Grove, IL (US); Alberto R. Cavallaro, Northbrook, IL (US)

(73) Assignee: Motorola Mobility LLC, Chicago, IL (US)

( * ) Notice: Subject to any disclaimer, the term of this patent is extended or adjusted under 35 U.S.C. 154(b) by 210 days.

(21) Appl. No.: 18/146,896

(22) Filed: Dec. 27, 2022

(65) Prior Publication Data

US 2023/0135394 A1 May 4, 2023

Related U.S. Application Data

(62) Division of application No. 16/910,513, filed on Jun. 24, 2020, now Pat. No. 11,554,575.

(51) Int. Cl.
| | |
|---|---|
| *B32B 7/12* | (2006.01) |
| *B32B 1/00* | (2006.01) |
| *B32B 17/10* | (2006.01) |
| *B32B 27/34* | (2006.01) |

(52) U.S. Cl.
CPC .................. *B32B 7/12* (2013.01); *B32B 1/00* (2013.01); *B32B 17/10018* (2013.01); *B32B 17/10724* (2013.01); *B32B 17/10807* (2013.01); *B32B 27/34* (2013.01); *B32B 2250/40* (2013.01); *B32B 2255/10* (2013.01); *B32B 2255/20* (2013.01); *B32B 2457/20* (2013.01)

(58) Field of Classification Search
CPC ........................... B32B 7/12; B32B 17/10018
See application file for complete search history.

(56) References Cited

U.S. PATENT DOCUMENTS

| | | | |
|---|---|---|---|
| 6,815,070 B1 * | 11/2004 | Burkle | .................. B32B 17/10 |
| | | | 427/166 |
| 10,020,462 B1 | 7/2018 | Ai et al. | |
| 11,554,575 B2 | 1/2023 | Paskiewicz et al. | |
| 2006/0014012 A1 | 1/2006 | Thies et al. | |
| 2012/0196103 A1 | 8/2012 | Murashige et al. | |

(Continued)

FOREIGN PATENT DOCUMENTS

| | | | |
|---|---|---|---|
| CN | 108291996 A | * | 7/2018 |
| JP | 2002-187236 A | * | 7/2002 |

OTHER PUBLICATIONS

""Fold"", Oxford English Dictionary, OED.com [retrieved Sep. 29, 2022]., 11 pages.

(Continued)

*Primary Examiner* — Jeffry H Aftergut
(74) *Attorney, Agent, or Firm* — FIG. 1 Patents (57) ABSTRACT

Implementations for composite display cover are described and provide improved protection and durability to device displays as compared with conventional display protection technologies. The described composite display cover, for instance, utilizes an ultra-thin glass layer with a polymer film applied directly to the glass layer and a hard coat applied to the polymer film. The polymer film, for instance, is applied to the glass layer without an adhesive. Further, the composite display cover can be attached to a display, such as via an adhesive layer that adheres the glass layer to a surface of the display.

20 Claims, 7 Drawing Sheets

(56) References Cited

U.S. PATENT DOCUMENTS

| | | | |
|---|---|---|---|
| 2013/0302594 A1 | 11/2013 | Sugiyama et al. | |
| 2017/0013729 A1 | 1/2017 | Rothkopf et al. | |
| 2017/0092884 A1* | 3/2017 | Zhang | H10K 59/879 |
| 2018/0217639 A1 | 8/2018 | Jones et al. | |
| 2019/0011954 A1* | 1/2019 | Chu | B32B 17/06 |
| 2020/0241594 A1* | 7/2020 | Cavallaro | B32B 7/12 |
| 2021/0402742 A1 | 12/2021 | Paskiewicz et al. | |

OTHER PUBLICATIONS

"Non-Final Office Action", U.S. Appl. No. 16/910,513, Feb. 8, 2022, 11 pages.

"Restriction Requirement", U.S. Appl. No. 16/910,513, Oct. 4, 2021, 7 pages.

U.S. Appl. No. 16/910,513 , "Final Office Action", U.S. Appl. No. 16/910,513, Jun. 16, 2022, 14 pages.

U.S. Appl. No. 16/910,513 , "Notice of Allowance", U.S. Appl. No. 16/910,513, Oct. 13, 2022, 8 pages.

Hollister, Sean , "Folding glass: how, why, and the truth of Samsung's Z Flip", Feb. 19, 2020, 13 pages.

* cited by examiner

COMPOSITE DISPLAY COVER

RELATED APPLICATION

This application is a division of and claims priority to U.S. patent application Ser. No. 16/910,513, filed Jun. 24, 2020, the entire disclosure of which is hereby incorporated by reference herein in its entirety.

BACKGROUND

Devices such as smart devices, wireless devices (e.g., cellular phones and tablet devices), consumer electronics, and the like can be implemented for use in a wide range of industries and for a variety of different applications. Typically, such devices include some form of display screen for outputting visual content and for receiving input, such as touch input from a user. To accommodate modern devices that implement a variety of form factors and functional configurations, display technologies have evolved that seek to provide thin display profiles that are also durable. This is particularly challenging for flexible devices, such as folding devices that require a display that can fold into different configurations.

BRIEF DESCRIPTION OF THE DRAWINGS

Implementations of the techniques for composite display cover are described with reference to the following Figures. The same numbers may be used throughout to reference like features and components shown in the Figures.

DETAILED DESCRIPTION

Implementations for composite display cover are described and provide improved protection and durability to device displays as compared with conventional display protection technologies. The described composite display cover, for instance, utilizes an ultra-thin glass layer with a polymer film applied directly to the glass layer and a hard coat applied to the polymer film. The polymer film, for instance, is applied to the glass layer without an adhesive. Further, the composite display cover can be attached to a display, such as via an adhesive layer that adheres the glass layer to a surface of the display. Generally, by adhering the polymer film directly to the glass layer without a separate adhesive, increased scratch and abrasion resistance is achieved as compared with conventional display protection techniques that utilize additional adhesive layers. For instance, typical adhesive layers utilized by conventional display technologies are soft and are thus prone to damage that results from user contact and/or contact with external objects. In at least some implementations, the hard coat is implemented utilizing a base material that is impregnated with nanoparticles to increase durability and/or to optimize a modulus of elasticity of the hard coat. Generally, the various layers of the composite display cover achieve a flexible structure that supports a variety of different display orientations, such as for foldable devices. Accordingly, by implementing a flexible composite display cover without an additional adhesive layer, the implementations described herein provide increased damage resistance than is experienced with conventional display technologies.

While features and concepts of composite display cover can be implemented in any number of different devices, systems, environments, and/or configurations, implementations of composite display cover are described in the context of the following example devices, systems, and method.

Figure 1:
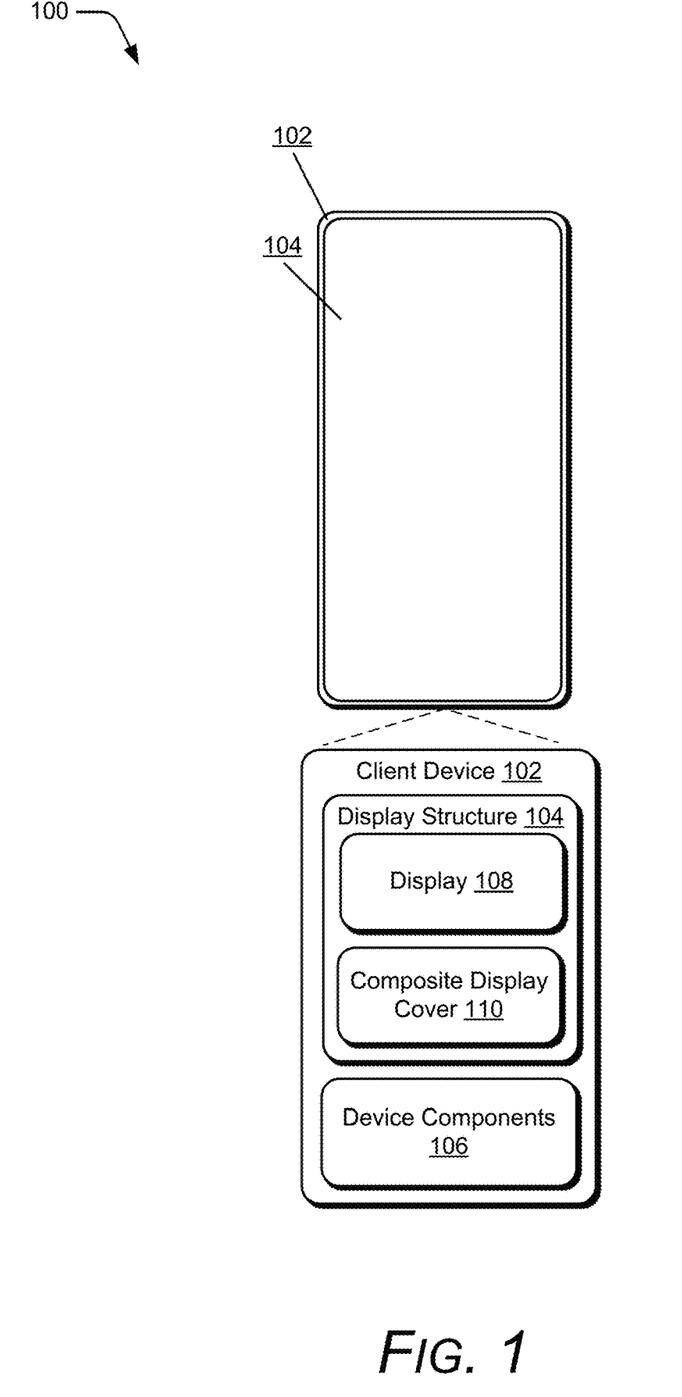
FIG. 1 depicts an environment in which techniques for composite display cover may be employed in accordance with one or more implementations of the techniques described herein.

FIG. 1 depicts an environment 100 in which techniques for composite display cover may be employed. The environment 100 includes a client device 102 that includes a display structure 104 and device components 106. Generally, the client device 102 may be implemented in a variety of different ways, such as a smartphone, a tablet device, a laptop, a wearable computing device (e.g., a smartwatch or a fitness tracker), and so forth. These examples are not to be construed as limiting, however, and the client device 102 can be implemented in a variety of different ways and form factors. Further example attributes of the client device 102 are discussed below with reference to the device 700 of FIG. 7.

The display structure 104 generally represents functionality for visual output by the client device 102 and may optionally be configured to receive input to the client device 102, such as touch input. The display structure 104 includes a display 108 and a composite display cover 110. The display 108 may be implemented according to a variety of different display technologies, such as organic light-emitting diode (OLED), light-emitting diode (LED), liquid-crystal display (LCD), and so forth. The composite display cover 110 represents a set of layers of material that are applied to the display 108 and that is fabricated according to techniques for composite display cover described herein, examples of which are detailed below.

The device components 106 generally represent different structural and functional components of the client device 102, such as a device chassis, a printed circuit board (PCB) and various electronic components such as wireless communication components, a camera, a battery, input/output components, and so forth.

Figure 2A:
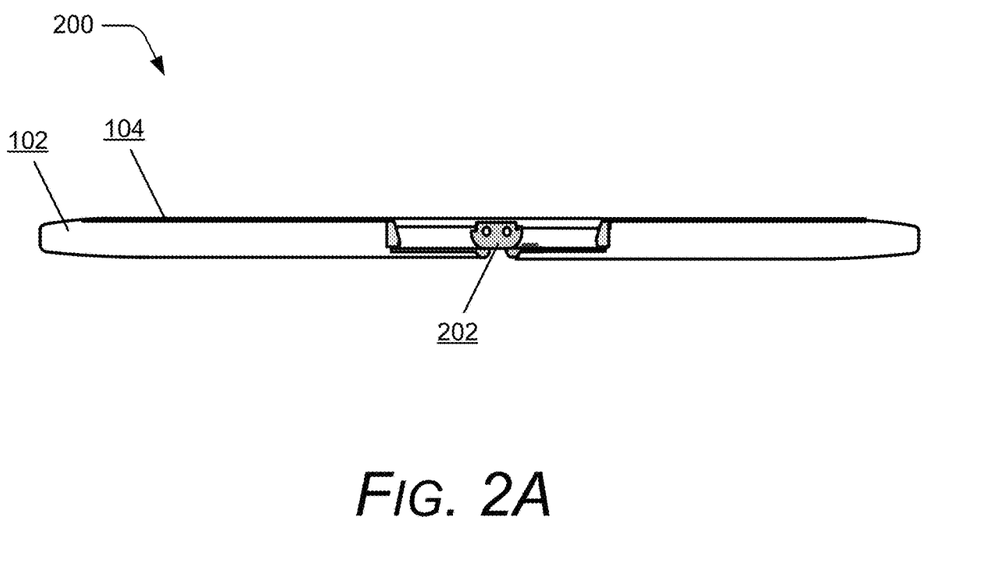
FIG. 2A depicts an implementation of a client device in the context of a folding device in an open orientation in accordance with one or more implementations of the techniques described herein.
Figure 2B:
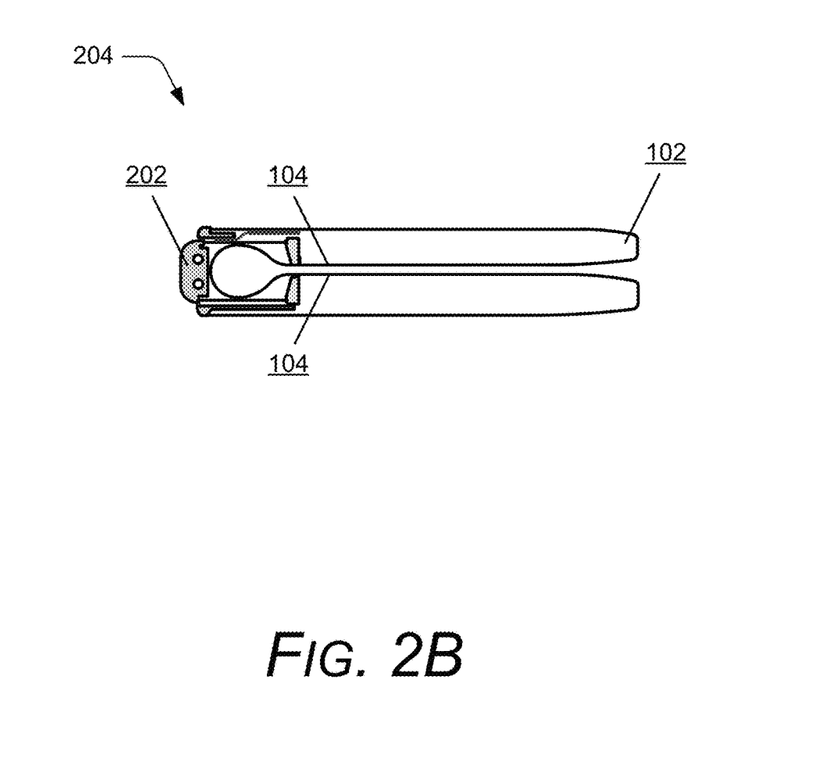
FIG. 2B depicts an implementation of a client device in the context of a folding device in a folded orientation in accordance with one or more implementations of the techniques described herein.

FIG. 2A depicts an implementation of the client device 102 in the context of a folding device in an open orientation. The client device 102 is depicted in an open position 200 including the display structure 104 in a planar orientation. Further depicted is a hinge 202 about which the client device 102 can be folded to assume a closed (e.g., folded) position. For instance, FIG. 2B depicts the client device 102 folded about the hinge 202 to assume a closed position 204. In the closed position, the display structure 104 is folded internally to the closed position of the client device 102. Generally, the composite display cover 110 is adhered to the display 108 and is foldable along with the display 108 to enable the client device 102 to assume a variety of different orientations. Additionally or alternatively to the closed position 204 with the display structure 104 folded internally to the client device 102, the client device 102 may folded outwardly from the open position 200 such that the display structure 104 is folded outwardly and exposed externally to the client device 102.

Figure 3:
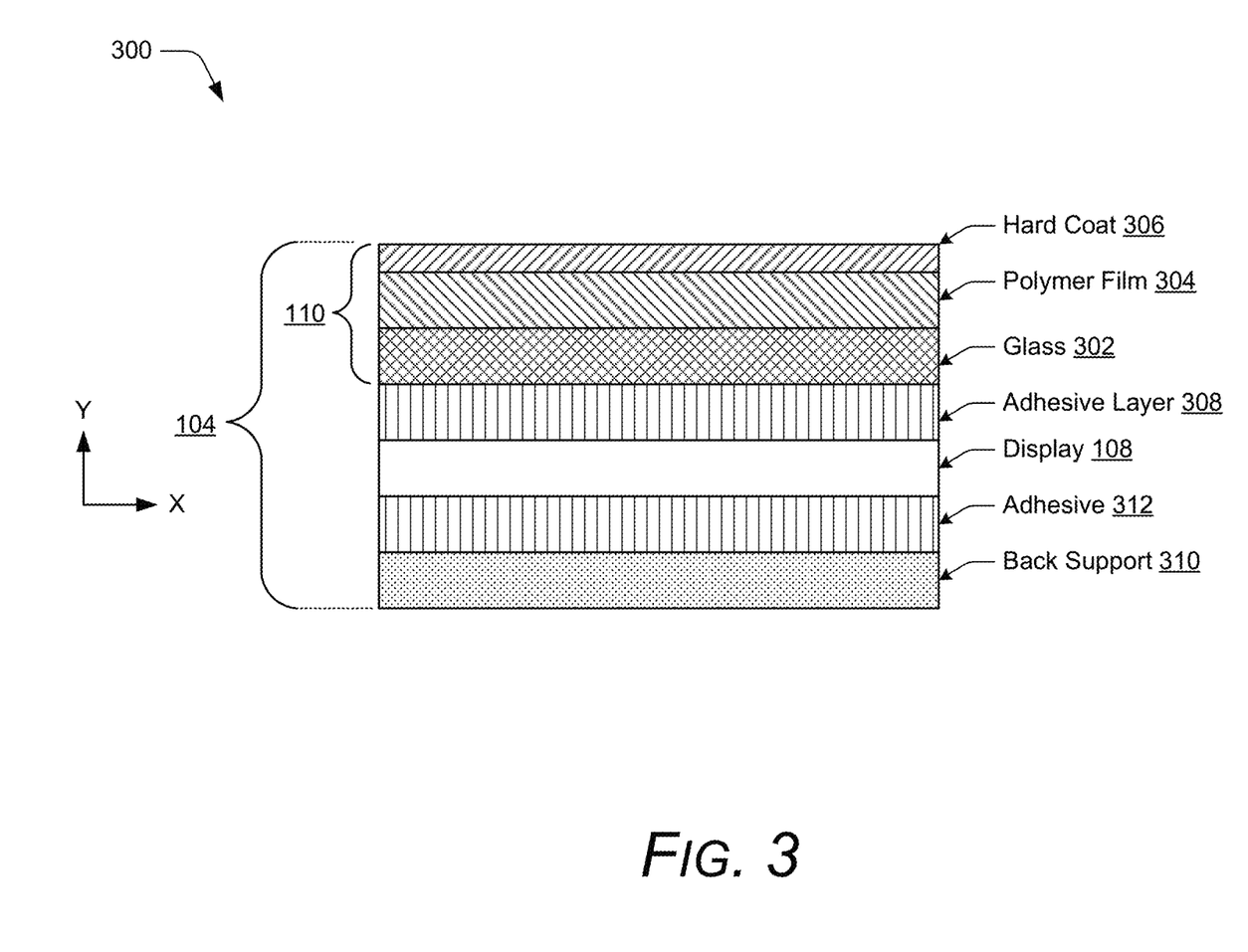
FIG. 3 depicts an enlarged cross section of a display structure that illustrates various components of the display structure in accordance with one or more implementations of the techniques described herein.

FIG. 3 depicts an enlarged cross section 300 of the display structure 104 that illustrates the various components of the display structure 104. For instance, the display structure 104 includes the composite display cover 110 adhered to the display 108. In this particular example, the composite display cover 110 includes an ultra-thin glass layer ("glass layer") 302 with a polymer film 304 coating and a hard coat 306 applied to the polymer film 304. Generally, the glass layer 302 can be implemented using any suitable glass material and thickness, such as within the range of 30-200 micrometers (μm). Further, the polymer film 304 can be formed from a polymer resin such as a colorless polyamide (CPI). The polymer film 304 can be applied to the glass layer 302 using any suitable application technique, such as polymer solution casting, spin coating, dip coating, and so forth. In at least one implementation, the polymer film 304 is applied directly to the glass 302 with no intervening layers, e.g., no adhesive. For instance, the composite display cover 110 does not include an adhesive layer to adhere the polymer film to the glass layer 302. Further, the glass layer 302 may be chemically strengthened prior to application of the polymer film 304, such as via an ion exchange process.

The hard coat 306 represents a coating configured to reduce damage to the polymer film 304 that may occur during device usage, such as scratches and abrasion that may result from user contact and/or contact with other objects. In at least some implementations, the hard coat 306 is implemented as a coating material filled with inorganic nanoparticles that increase the durability of the hard coat 306 while allowing the hard coat 306 to remain flexible, such as in a folding device scenario as depicted in FIGS. 2A, 2B. Generally, any suitable coating material may be utilized as a base material for the hard coat 306, such as a flexible polymer, e.g., an acrylate resin. The hard coat 306, for instance, may be formed by generating a dispersion that includes a polymerizable material along with inorganic nanoparticles that is then polymerized to form the hard coat 306. Further, the inorganic nanoparticles can be included in various amounts, such as at least 50 weight percentage (wt %) relative to the base material. In at least one implementation, the inorganic nanoparticles are formed from an inorganic material such as silicon dioxide ($SiO_2$ or silica), indium tin oxide (ITO), antimony tin oxide (ATO), fluorinated tin oxide (FTO), aluminum oxide ($Al_2O_3$), titanium dioxide ($TiO_2$) zinc oxide (ZnO), etc. The hard coat 306 may be applied to the polymer film 304 utilizing a suitable coating technique, such as solution casting, dip coating, spin coating, and so forth. In at least one implementation, the hard coat 306 has a higher modulus of elasticity than the polymer film 304. The polymer film 304, for instance, has a modulus in the range of 6-7 gigapascals (GPa), and the hard coat 306 has a modulus in the range of 20-30 GPa.

As further depicted in the cross section 300, the composite display cover 110 is attached (e.g., laminated) to the display 108 via an adhesive layer 308 which includes an optically clear adhesive that bonds the composite display cover 110 to the display 108. In at least one implementation, the display 108 is implemented as a foldable plastic OLED that is flexible to assume a variety of different orientations. To provide sufficient rigidity to the display structure 104, the display 108 is adhered to a back support 310 via an adhesive layer 312. The back support 310 can be formed from a rigid material of suitable flexibility, such as a thin stainless-steel sheet. Although not depicted here, the hard coat 306 may be coated with an anti-fingerprint coating to reduce persistence of fingerprints and other staining substances on the surface of the display structure 104.

In at least one implementation, the composite display cover 110 is applied to the display 108 to optimize the location of a neutral axis of the display. For instance, a location of the neutral axis of the display 108 can be optimized via application of the composite display cover 110, which may reduce mechanical stress on the display 108 when the display 108 is manipulated between different folded positions, such as depicted in FIGS. 2A, 2B.

Figure 4:
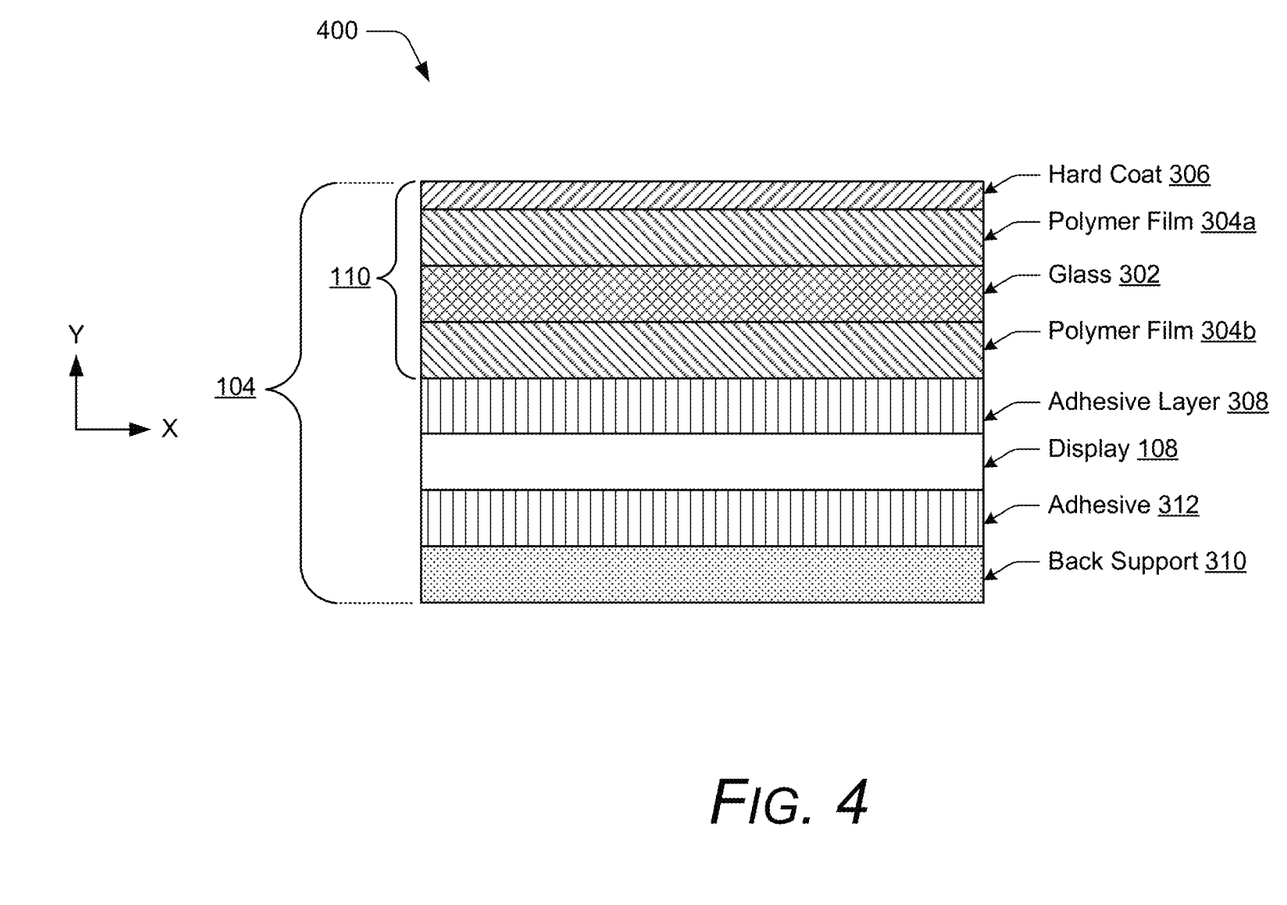
FIG. 4 depicts an enlarged cross section of a display structure that represents a variation on the implementation described in FIG. 3 in accordance with one or more implementations of the techniques described herein.

FIG. 4 depicts an enlarged cross section 400 of the display structure 104 that represents a variation on the implementation described in FIG. 3. The cross section 400 illustrates various components of the display structure 104 discussed in FIG. 3, but in this implementation, the display structure 104 includes a polymer film 304a on a top surface of the glass 302, and a polymer film 304b on a bottom surface of the glass 302. In at least one implementation, the polymer films 304a, 304b are applied directly to the glass 302 with no intervening layers, e.g., no adhesive.

Figure 5:
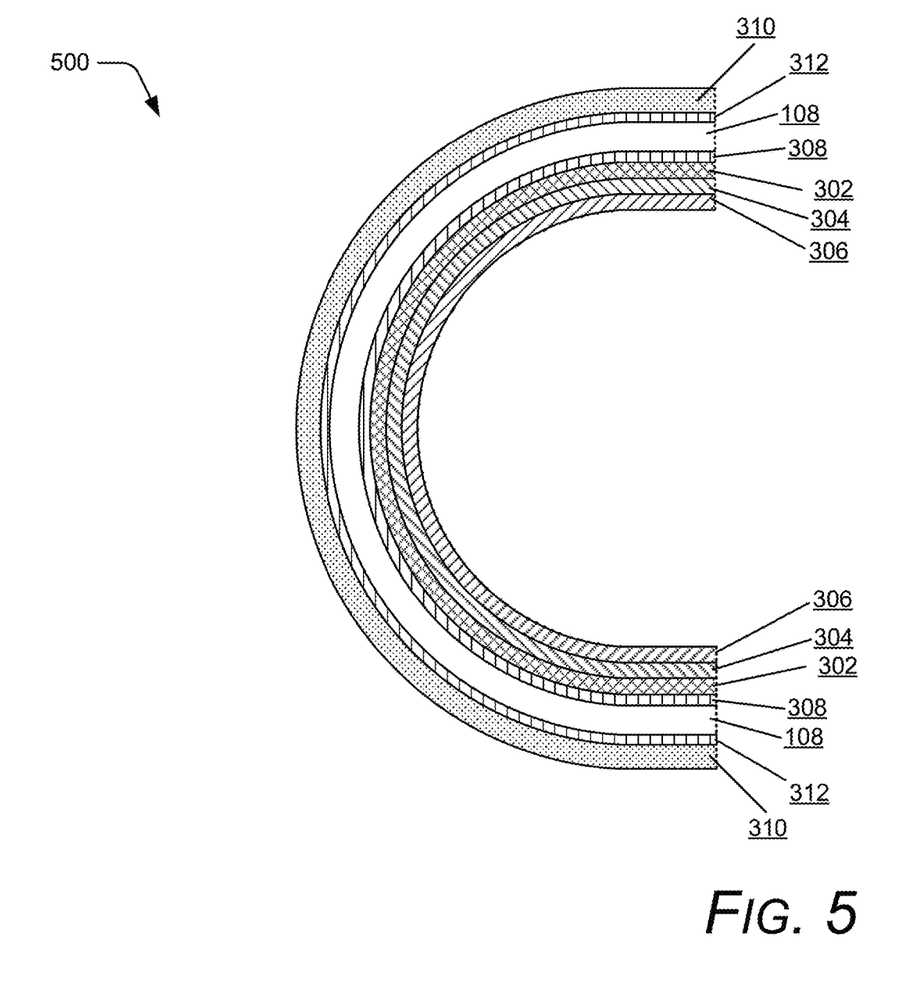
FIG. 5 depicts an enlarged partial cross section of the display structure that represents a preformed curved implementation in accordance with one or more implementations of the techniques described herein.

FIG. 5 depicts an enlarged partial cross section 500 of the display structure 104 that represents a variation on the implementations described in FIGS. 3, 4. In this particular implementation, the display structure 104 is constructed in a preformed curved shape prior to installation on the client device 102. The display structure 104, for instance, can be formed on a curved mandrel prior to installation on the client device 102. Generally, by forming the display structure 104 in a curved orientation prior to installation, stress on the display structure 104 caused by assuming a folded orientation can be reduced. This implementation of the display structure 104 includes the various layers detailed above. In this particular implementation, the curved orientation may represent a default, stressless orientation of the display structure 104.

The various implementations depicted and discussed above may be combined and iterated in various ways to provide a wide variety of different composite display covers and display structures to accommodate a variety of different usage scenarios.

Figure 6:
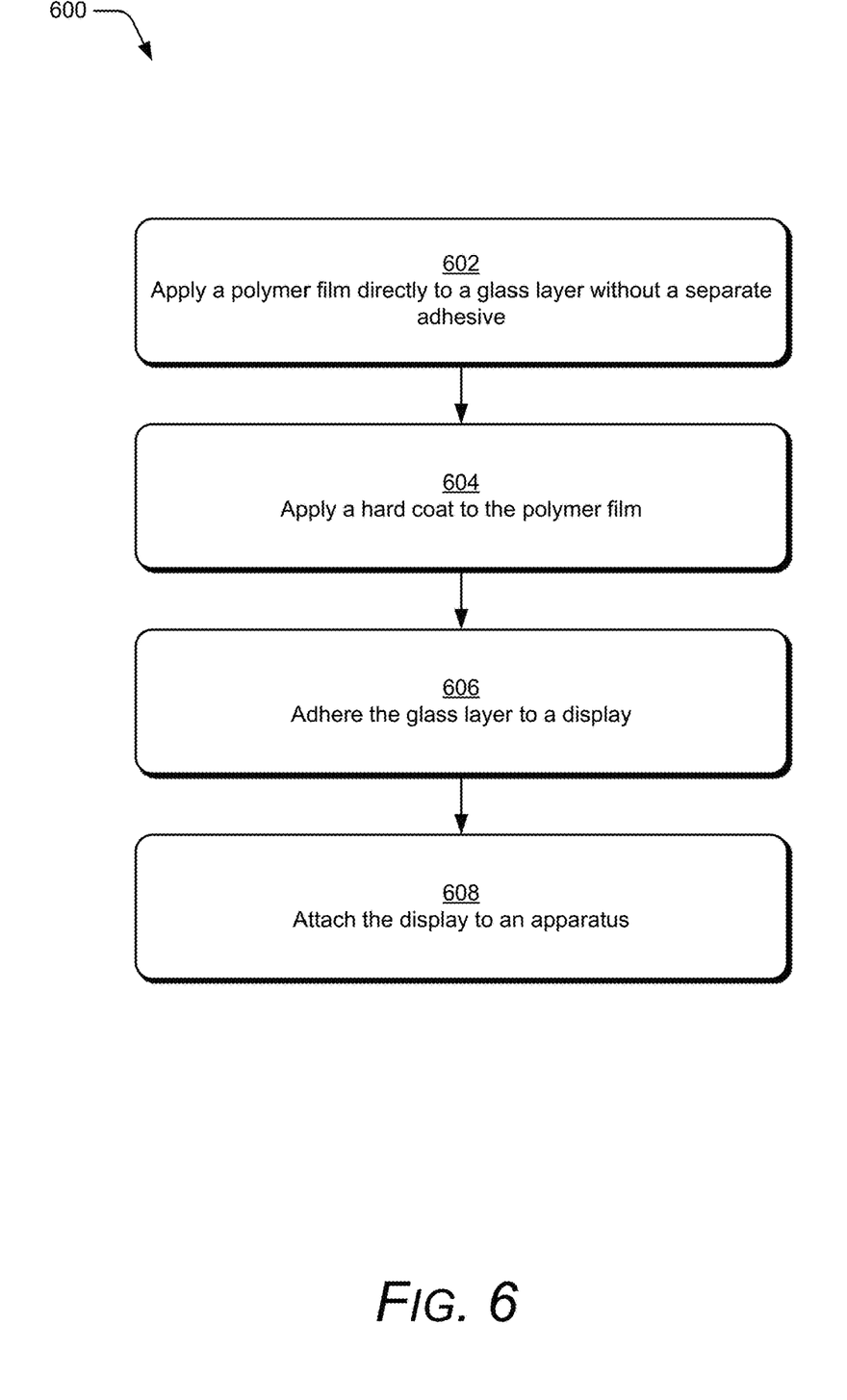
FIG. 6 illustrates an example method of fabricating a composite display cover and applying the display cover to a display in accordance with one or more implementations of the techniques described herein.

FIG. 6 illustrates an example method 600 of fabricating a composite display cover and applying the display cover to a display according to various implementations. The order in which the method is described is not intended to be construed as a limitation, and any number or combination of the described method operations can be performed in any order to perform a method, or an alternate method.

At 602, a polymer film is applied directly to a glass layer without a separate adhesive. As discussed above, the polymer film can include a colorless material such as a polyamide that is applied using a suitable application technique, such as solution casting, dip coating, spin coating, and so forth. Further, the polymer film can be applied to a single side or both sides of the glass layer. In at least one implementation, the glass layer is chemically strengthened prior to applying the polymer film to the glass layer, such as via an ion exchange process.

At 604, a hard coat is applied to the polymer film. Generally, the hard coat represents a base material such as an acrylate resin that is impregnated with particles (e.g., nanoparticles) of a different material, such as an inorganic material. Further, the hard coat can be applied to the polymer film using a suitable application technique, such as solution casting, dip coating, spin coating, and so forth.

At 606, the glass layer is adhered to a display. The glass layer, polymer film, and hard coat, for instance, make up a composite display cover that is attached to a display, such as via an optically clear adhesive.

At 608, the display is attached to an apparatus. In at least one implementation, a backing support layer (e.g., a stainless-steel layer) is attached to the display opposite the composite display cover and in conjunction with attachment to an associated device, such as the client device 102.

In at least one implementation, the method 600 can be performed with the various components (e.g., the display 108 and the composite display cover 110) in a curved (e.g., folded or partially folded) orientation to generate the display structure 104 in a curved orientation. For instance, in such an implementation, the curved orientation represents a default unstressed orientation of the composite display cover 110 and/or the display structure 104.

In addition to providing protection and durability to the display 108, the composite display cover 110 can be utilized to optimize a neutral axis location of the display 108. For instance, applying the composite display cover 110 to the display 108 can shift a location of the neutral axis (e.g., an axis across a width of the display 108) to reduce stress on the display 108 that may occur when the display structure 104 is manipulated between different folded and unfolded orientations.

Figure 7:
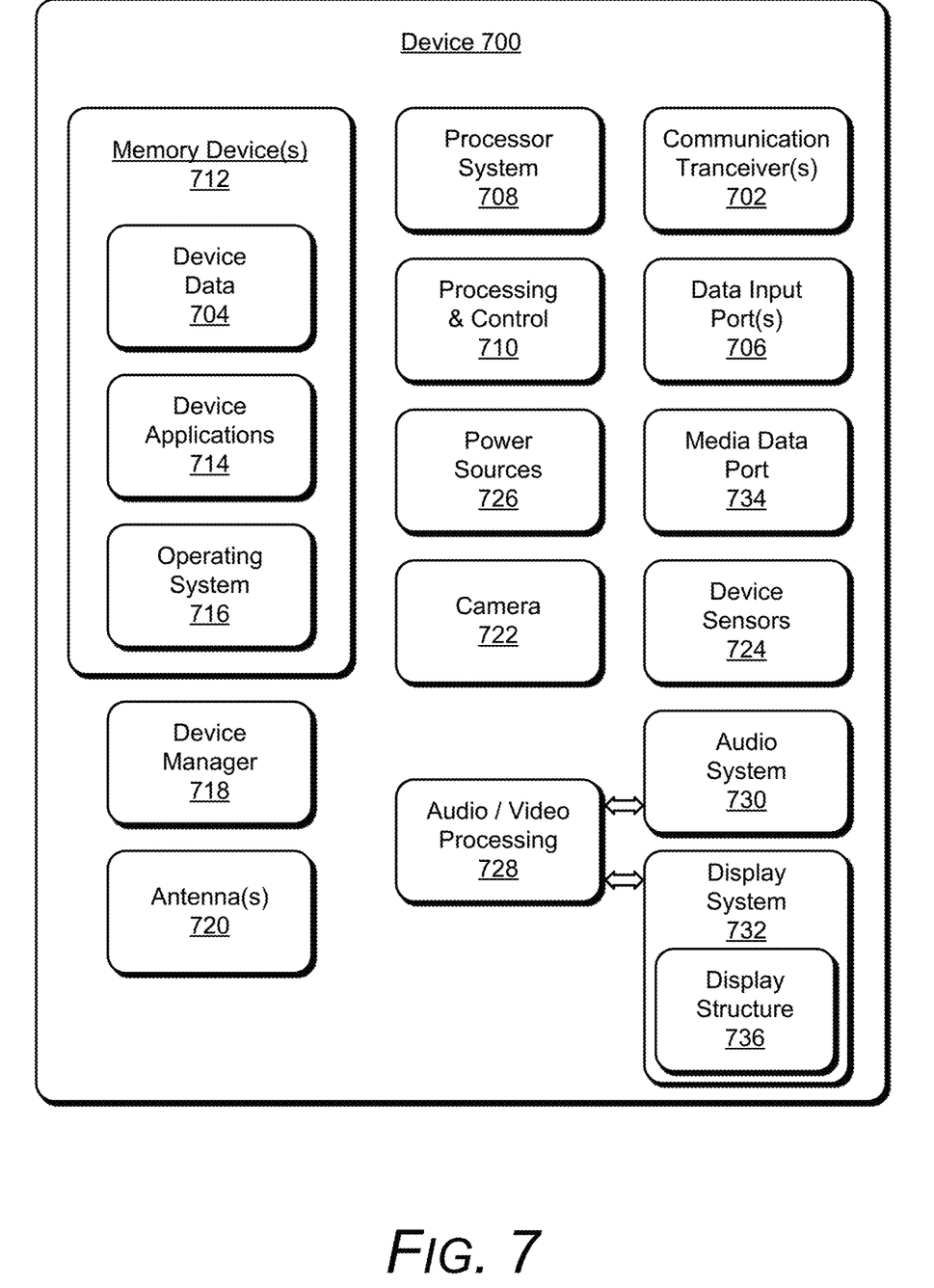
FIG. 7 illustrates various components of an example device that can used to implement the techniques of composite display cover as described herein.

FIG. 7 illustrates various components of an example device 700, in which aspects of composite display cover can be implemented. The example device 700 can be implemented as any of the devices described with reference to the previous FIGS. 1-6, such as any type of a wireless device, mobile phone, client device, companion device, paired device, display device, tablet, computing, communication, entertainment, gaming, media playback, and/or any other type of computing and/or electronic device. For example, the client device 102 described above may be implemented as the example device 700.

The device 700 includes communication transceivers 702 that enable wired and/or wireless communication of device data 704 with other devices. The device data 704 can include any type of audio, video, and/or image data. Example communication transceivers 702 include wireless personal area network (WPAN) radios compliant with various IEEE 702.15 (Bluetooth™) standards, wireless local area network (WLAN) radios compliant with any of the various IEEE 702.11 (WiFi™) standards, wireless wide area network (WWAN) radios for cellular phone communication, wireless metropolitan area network (WMAN) radios compliant with various IEEE 702.16 (WiMAX™) standards, and wired local area network (LAN) Ethernet transceivers for network data communication.

The device 700 may also include one or more data input ports 706 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 700 includes a processor system 708 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 710. The device 700 may further include any type of a system bus or other data and command transfer system that couples the various components within the device. A system bus can include any one or combination of different bus structures and architectures, as well as control and data lines.

The device 700 also includes computer-readable storage memory 712 (e.g., memory devices) that enable data storage, such as data storage devices that can be accessed by a computing device, and that provide persistent storage of data and executable instructions (e.g., software applications, programs, functions, and the like). Examples of the computer-readable storage memory 712 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 700 may also include a mass storage media device.

The computer-readable storage memory 712 provides data storage mechanisms to store the device data 704, other types of information and/or data, and various device applications 714 (e.g., software applications). For example, an operating system 716 can be maintained as software instructions with a memory device and executed by the processor system 708. The device applications may also include a device manager 718, such as any form of a control application, software application, signal-processing and control module, code that is native to a particular device, a hardware abstraction layer for a particular device, and so on.

In this example, the device 700 includes one or more antennas 720 for transmitting and receiving wireless signal. Generally, the one or more antennas 720 may represent multiple antennas positioned at various regions of the client device 102 described above.

In this example, the device 700 also includes a camera 722 and device sensors 724, such as a temperature sensor to monitor device component operating temperatures (to include the antenna modules 720), and device sensors such as may be implemented as components of an inertial measurement unit (IMU). The device sensors 724 can be implemented with various motion sensors, such as a gyroscope, an accelerometer, and/or other types of motion sensors to sense motion of the device. The motion sensors can generate sensor data vectors having three-dimensional parameters (e.g., rotational vectors in x, y, and z-axis coordinates) indicating location, position, acceleration, rotational speed, and/or orientation of the device. The device 700 can also include one or more power sources 726, such as when the device is implemented as a wireless device or collaborative device. The power sources may include a charging and/or power system, and can be implemented as a flexible strip battery, a rechargeable battery, a charged super-capacitor, and/or any other type of active or passive power source.

The device 700 can also include an audio and/or video processing system 728 that generates audio data for an audio system 730 and/or generates display data for a display system 732. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 734. In implementations, the audio system and/or the display system are integrated components of the example device. Alternatively, the audio system and/or the display system are external, peripheral components to the example device.

The display system 732 includes a display structure 736, which represents an implementation of the display structure 104 detailed above. The display structure 736, for example, includes the display 108 and the composite display cover 110 which may be generated and implemented in various ways, examples of which are presented in the preceding discussion.

Although implementations of composite display cover have been described in language specific to features and/or methods, the subject of the appended claims is not necessarily limited to the specific features or methods described. Rather, the specific features and methods are disclosed as example implementations of composite display cover, and other equivalent features and methods are intended to be within the scope of the appended claims. Further, various different examples are described, and it is to be appreciated that each described example can be implemented independently or in connection with one or more other described examples. Additional aspects of the techniques, features, and/or methods discussed herein relate to one or more of the following:

An apparatus including: a housing with internal components situated therein; a display attached to the housing; and a composite display cover attached to the display, the composite display cover including: a glass layer adhered to the display; a polymer film applied directly to the glass layer; and a hard coat applied to the polymer film opposite the glass layer.

In addition to the above-described apparatus, any one or more of the following: wherein the display and the composite display cover are foldable to assume a folded orientation; wherein the hard coat has a higher modulus of elasticity than the polymer film; wherein the composite display cover does not include a separate adhesive layer between the polymer film and the glass layer; wherein the polymer film is applied to a first side of the glass layer and to a second side of the glass layer opposite the first side; wherein polymer film includes a colorless polyamide applied directly to the glass layer; wherein the hard coat includes a base material impregnated with nanoparticles made of an inorganic substance; wherein the composite display cover is attached to a first side of the display, and wherein the apparatus further includes a back support layer attached to a second side of the display opposite the first side.

A composite display cover for attachment to a display, the composite display cover including: a glass layer configured to be adhered to the display; a polymer film attached directly to the glass layer; and a hard coat applied to the polymer film.

In addition to the above-described composite display covers, any one or more of the following: wherein the polymer film is attached directly to the glass layer without a separate adhesive; wherein the composite display cover is foldable into a folded orientation while remaining intact; wherein the composite display cover is formed in a curved orientation as a default orientation for the composite display cover; wherein the hard coat includes a base material impregnated with silicon dioxide particles at a mixture of at least 50 weight percentage; wherein the polymer film is adhered directly to a first side of the glass layer and a second side of the glass layer opposite the first side, and without a separate adhesive to adhere to the polymer film to the glass layer.

A method for generating a composite display cover for a display, the method including: applying a polymer film directly to a glass layer without a separate adhesive, the glass layer being configured to be adhered to a display; and applying a hard coat to the polymer film.

In addition to the above-described methods, any one or more of the following: wherein the glass layer is chemically strengthened prior to applying the polymer film to the glass layer; wherein said applying the polymer film directly to the glass layer includes performing one or more of solution casting, dip coating, or spin coating to apply the polymer film to the glass layer; wherein said applying the polymer film directly to the glass layer includes applying the polymer film directly to a first side of the glass layer and second side of the glass layer opposite the first side; wherein the glass layer is formed in a curved orientation as a default orientation of the glass layer, and wherein the polymer film and the hard coat are applied in the curved orientation; further including adhering the composite display cover to a display to affect a position of a neutral axis of the display.

The invention claimed is:

1. A method for generating a foldable composite display cover, the method comprising:
   applying a first foldable polymer film directly to a first surface of a foldable glass layer, the foldable glass layer being configured to be adhered to a foldable display;
   applying a second foldable polymer film directly to a second surface of the foldable glass layer opposite the first surface of the foldable glass layer;
   applying a foldable hard coat to the second foldable polymer film; and
   preforming the first foldable polymer film, the foldable glass layer, the second foldable polymer film, and the foldable hard coat in a curved orientation, the curved orientation representative of a default unstressed orientation of the foldable composite display cover prior to attachment to the foldable display.

2. The method as described in claim 1, wherein the foldable glass layer is chemically strengthened prior to applying the first foldable polymer film and the second foldable polymer film to the foldable glass layer.

3. The method as described in claim 1, wherein the applying the first foldable polymer film and the second foldable polymer film directly to the foldable glass layer comprises performing one or more of solution casting, dip coating, or spin coating.

4. The method as described in claim 1, wherein the preforming includes preforming the foldable glass layer in the curved orientation, and wherein the first foldable polymer film and the second foldable polymer film, and the foldable hard coat are applied while the foldable glass layer is configured in the curved orientation.

5. The method as described in claim 1, further comprising adhering the foldable composite display cover to the foldable display to affect a position of a neutral axis of the foldable display.

6. The method as described in claim 1, wherein the foldable glass layer is chemically strengthened prior to application of the first foldable polymer film via an ion exchange process.

7. The method as described in claim 1, wherein said applying the foldable hard coat to the second foldable polymer film comprises performing one or more of solution casting, dip coating, or spin coating to apply the foldable hard coat to the second foldable polymer film.

8. The method as described in claim 1, wherein the first foldable polymer film and the second foldable polymer film are a colorless polyamide, the foldable glass layer is an ultra-thin glass layer with a thickness between 50-200 micrometers, and the foldable hard coat is an acrylate resin polymer.

9. A method for generating a composite display cover in a preformed folded orientation, the method comprising:
applying a foldable polymer film directly to a foldable glass layer without a separate adhesive;
applying a foldable hard coat to the foldable polymer film; and
preforming the foldable glass layer, the foldable polymer film, and the foldable hard coat in a folded orientation that represents a default unstressed orientation of the composite display cover prior to attachment to a display.

10. The method as described in claim 9, wherein the foldable glass layer, the foldable polymer film, and the foldable hard coat are preformed in the folded orientation via a curved mandrel to reduce stress on the composite display cover when folded.

11. The method as described in claim 9, further comprising adhering the composite display cover to a foldable display to shift a position of a neutral axis across a width of the foldable display.

12. The method as described in claim 9, wherein the preforming includes preforming the foldable glass layer in a curved orientation and applying the foldable polymer film and the foldable hard coat to the foldable glass layer while the foldable glass layer is configured in the curved orientation.

13. A method for generating a composite display cover for a display, the method comprising:
preforming a glass layer in a curved orientation that represents a default unstressed orientation of the glass layer prior to attachment to the display;
applying a polymer film directly to the glass layer without a separate adhesive; and
applying a hard coat to the polymer film.

14. The method as described in claim 13, wherein the glass layer is chemically strengthened prior to applying the polymer film to the glass layer.

15. The method as described in claim 13, wherein the applying the polymer film directly to the glass layer comprises performing one or more of solution casting, dip coating, or spin coating to apply the polymer film to the glass layer.

16. The method as described in claim 15, wherein the applying the polymer film directly to the glass layer comprises applying the polymer film directly to a first side of the glass layer and second side of the glass layer opposite the first side.

17. The method as described in claim 13, further comprising adhering the composite display cover to the display to affect a position of a neutral axis of the display.

18. The method as described in claim 13, further comprising adhering a backing support layer to the display opposite the composite display cover.

19. The method as described in claim 13, wherein the glass layer is chemically strengthened prior to application of the polymer film via an ion exchange process.

20. The method as described in claim 13, wherein the applying the hard coat to the polymer film comprises performing one or more of solution casting, dip coating, or spin coating to apply the hard coat to the polymer film.

* * * * *